(12) United States Patent
Chen et al.

(10) Patent No.: US 12,475,774 B2
(45) Date of Patent: Nov. 18, 2025

(54) METHOD AND SYSTEM FOR MONITORING HUMAN MOVEMENT POSTURE, HUMAN POSTURE MONITOR, STORAGE MEDIUM AND PROCESSOR

(71) Applicants: Gree Electric Appliances, Inc. of Zhuhai, Guangdong (CN); Leayun Technology Co., Ltd. of Zhuhai, Guangdong (CN)

(72) Inventors: Jizhou Chen, Guangdong (CN); Jie Tang, Guangdong (CN); Hongwei Xu, Guangdong (CN); Zhangzhang Yan, Guangdong (CN); Lizhen Feng, Guangdong (CN); Jinhui Chen, Guangdong (CN); Canjian Chen, Guangdong (CN)

(73) Assignees: Gree Electric Appliances, Inc. of Zhuhai, Zhunai (CN); Leayun Technology Co., Ltd. of Zhuhai, Zhunai (CN)

( * ) Notice: Subject to any disclaimer, the term of this patent is extended or adjusted under 35 U.S.C. 154(b) by 854 days.

(21) Appl. No.: 17/622,327

(22) PCT Filed: Dec. 27, 2019

(86) PCT No.: PCT/CN2019/129046
§ 371 (c)(1),
(2) Date: Dec. 23, 2021

(87) PCT Pub. No.: WO2020/258804
PCT Pub. Date: Dec. 30, 2020

(65) Prior Publication Data
US 2022/0248981 A1    Aug. 11, 2022

(30) Foreign Application Priority Data

Jun. 25, 2019   (CN) .......................... 201910556366.X

(51) Int. Cl.
*A61B 5/00* (2006.01)
*G01S 13/88* (2006.01)
*G08B 21/04* (2006.01)

(52) U.S. Cl.
CPC .......... *G08B 21/0438* (2013.01); *G01S 13/88* (2013.01); *G08B 21/043* (2013.01)

(58) Field of Classification Search
CPC ....... A61B 5/0507; A61B 5/11; A61B 5/1113; A61B 5/1114; A61B 5/1116;
(Continued)

(56) References Cited

U.S. PATENT DOCUMENTS

| 10,225,492 B1 * | 3/2019 | Steffanson ............... H04N 5/33 |
| 2013/0002434 A1 * | 1/2013 | Cuddihy ................. G01S 13/18 342/28 |

(Continued)

FOREIGN PATENT DOCUMENTS

| CN | 104076357 A | 10/2014 |
| CN | 106646457 A | 5/2017 |

(Continued)

OTHER PUBLICATIONS

International Search Report, with a mailing date of Mar. 10, 2020, in International application No. PCT/CN2019/129046, filed on Dec. 27, 2019 (6 pages).

*Primary Examiner* — May A Abouelela
(74) *Attorney, Agent, or Firm* — McAndrews, Held & Malloy, Ltd.

(57) ABSTRACT

Disclosed are a method and system for monitoring a human movement posture, a human posture monitor, a storage medium and a processor. The monitoring method includes: receiving a microwave detection signal, wherein the microwave detection signal is a detection signal obtained after microwave scanning is conducted on a target region (S102);

(Continued)

determining whether a current movement posture of a preset person in the target region is in a range of dangerous postures according to the microwave detection signal, wherein the current movement posture is an action form of the preset person at a position at a current time point (S104); and sending out an alarm signal when the current movement posture of the preset person in the target region is in the range of dangerous postures (S106).

9 Claims, 3 Drawing Sheets

(58) Field of Classification Search
CPC ....... A61B 5/1117; A61B 5/112; A61B 5/746; A61B 5/7475; A61B 2562/0228; A61B 2505/07; A61B 5/1126; G01S 7/412; G01S 13/32; G01S 13/50; G01S 13/88; G01S 13/886; G01S 7/415; G01S 13/58; G08B 21/043; G08B 21/0438; G08B 21/0469

See application file for complete search history.

(56) References Cited

U.S. PATENT DOCUMENTS

| | | | |
|---|---|---|---|
| 2019/0103007 | A1* | 4/2019 | Tan ........................ A61B 5/681 |
| 2020/0118410 | A1* | 4/2020 | Lindström ............ A61B 5/1113 |
| 2021/0245763 | A1* | 8/2021 | Gomez ................. G01S 7/2883 |

FOREIGN PATENT DOCUMENTS

| | | |
|---|---|---|
| CN | 108968970 A | 12/2018 |
| CN | 109239707 A | 1/2019 |
| CN | 109765552 A | 5/2019 |
| CN | 109799501 A | 5/2019 |
| CN | 110187341 A | 8/2019 |
| WO | 2017187407 A1 | 11/2017 |

* cited by examiner

METHOD AND SYSTEM FOR MONITORING HUMAN MOVEMENT POSTURE, HUMAN POSTURE MONITOR, STORAGE MEDIUM AND PROCESSOR

CROSS-REFERENCE TO RELATED APPLICATION

The disclosure is a 371 of International Patent Application No. PCT/CN2019/129046, filed Dec. 27, 2019, which claims the priority of Chinese patent application No. 201910556366.X, filed on Jun. 25, 2019 and entitled "a method and system for monitoring a human movement posture, and a human posture monitor", which are incorporated herein by reference in their entireties.

TECHNICAL FIELD

The disclosure relates to the technical field of intelligent monitoring, and in particular to a method and system for monitoring a human movement posture, a human posture monitor, a storage medium and a processor.

BACKGROUND

In the related technology, the elderly and children are prone to accidents at home, such as slipping at home and stumbling over tools, which may cause danger to their lives due to the fact that they are too weak to get back on their feet, and have no help to stand up or care for a long time. Therefore, an external monitoring apparatus is required to monitor a movement condition of a user in a room. In a current monitoring mode, a camera or an infrared sensor is generally used to photograph a room or send an infrared signal for detection, which cannot monitor whether the user is dangerous when the user moves in a region with a high vapor concentration.

SUMMARY

The embodiments of the disclosure provide a method and system for monitoring a human movement posture, a human posture monitor, a storage medium and a processor, so as to at least solve the technical problem that in the related technology, it is impossible to determine whether a user is dangerous.

One aspect of the embodiments of the disclosure provides a method for monitoring a human movement posture. The method includes: receiving a microwave detection signal, where the microwave detection signal is a detection signal obtained after microwave scanning is conducted on a target region; determining whether a current movement posture of a preset person in the target region is in a range of dangerous postures according to the microwave detection signal, wherein the current movement posture is an action form of the preset person at a position at a current time point; and sending out an alarm signal when the current movement posture of the preset person in the target region is in the range of dangerous postures.

In some embodiments, the receiving a microwave detection signal includes: controlling a microwave radar device to scan according to a preset scanning rule, each sub-region of the target region to obtain a scanning result; determining a current position of the preset person in the target region based on the scanning result; controlling the microwave radar device to scan continuously, the current position and the preset person to obtain a microwave detection signal of preset duration; and receiving the microwave detection signal of preset duration sent by the microwave radar device.

In some embodiments, controlling the microwave radar device to scan continuously the current position and the preset person to obtain a microwave detection signal of preset duration includes: controlling the microwave radar device to emit continuously an electromagnetic wave of preset frequency to the current position and the preset person; controlling the microwave radar device to detect Doppler frequency offset of an echo to obtain the microwave detection signal of preset duration.

In some embodiments, determining whether a current movement posture of a preset person in the target region is in a range of dangerous postures according to the microwave detection signal includes: analyzing the microwave detection signal to obtain the current movement postures of the preset person at different time points within preset duration; comparing the current movement postures of the preset person at each of the different time points to determine a posture change amplitude; and determining whether the current movement posture of the preset person in the target region is in the range of dangerous postures based on the posture change amplitude and a dangerous posture reference in a preset database.

In some embodiments, the sending out an alarm signal when the current movement posture of the preset person in the target region is in the range of dangerous postures includes: controlling an alarm module of a microwave radar device to send out the alarm signal, where the microwave radar device is configured to conduct the microwave scanning on the target region to obtain the microwave detection signal; or, sending the alarm signal to the communication device when the microwave radar device and communication device held by the preset person are in the same local area network; or, sending the alarm signal to a cloud server, when the microwave radar device and the communication device held by the preset person are not in the same local area network, and sending the alarm signal to the communication device by means of the cloud server, wherein the cloud server and the microwave radar apparatus are in the same wide area network.

In some embodiments, after the alarm signal is sent out, the monitoring method further includes: monitoring whether there is an alarm cancel instruction; controlling the alarm module of the microwave radar apparatus to stop giving an alarm when monitored that the microwave radar device receives the alarm cancel instruction; and stopping sending the alarm signal to the communication device when monitored that the communication device held by the preset person receives the alarm cancel instruction.

Another aspect of the embodiments of the disclosure further provides a human posture monitor. The human posture monitor includes: a processor; and a memory configured to store an executable instruction of the processor; wherein the processor is configured to execute the executable instruction to execute the method for monitoring a human movement posture according to any one described above.

Another aspect of the embodiments of the disclosure further provides a system for monitoring a human movement posture. The system includes: a microwave radar device which is configured to obtain a microwave detection signal after microwave scanning is conducted on a target region; and a center control device which is configured to analyze whether a current movement posture of a preset person in the target region is in a range of dangerous postures according to the microwave detection signal, and control an alarm module of the microwave radar apparatus to send out an alarm signal, when the current movement posture of the preset person in the target region is in the range of dangerous postures.

In some embodiments, the system for monitoring a human movement posture further includes: a communication device connects with the center control device by remote communication connection, the communication device which is configured to receive the microwave detection signal or alarm information; and a cloud server which is configured to store the microwave detection signal or send the alarm information to the communication device, wherein the cloud server and the microwave radar device are in the same wide area network.

Another aspect of the embodiments of the disclosure further provides a storage medium. The storage medium is configured to store a program, wherein when the program is executed by a processor, an device where the storage medium is located is controlled to execute the method for monitoring a human movement posture according to any one described above.

Another aspect of the embodiments of the disclosure further provides a processor. The processor is configured to run a program, wherein when the program runs, the method for monitoring a human movement posture according to any one described above is executed.

In the embodiments of the disclosure, the microwave detection signal is received, wherein the microwave detection signal is the detection signal obtained after the microwave scanning is conducted on the target region; according to the microwave detection signal, it is determined whether the current movement posture of the preset person in the target region is in the range of dangerous postures, wherein the current movement posture is the action form of the preset person at the position at the current time point; and the alarm signal is sent out when the current movement posture of the preset person in the target region is in the range of dangerous postures. In the embodiments, a microwave signal sent by the microwave radar device has desirable penetrability to effectively monitor an environment with a high vapor concentration, such as a shower room, monitor the human movement posture and monitor whether the user is dangerous, when it is determined that a dangerous posture occurs, the alarm signal may be used to inform the corresponding personnel of the dangerous posture, monitoring data is accurate, other users may be informed of a monitoring result in time, user safety is guaranteed, thereby solving the technical problem that in the related technology, as the movement environment with a high vapor concentration cannot be monitored, it is impossible to determine whether the user is dangerous.

BRIEF DESCRIPTION OF THE DRAWINGS

The drawings shown herein, which form a part of the disclosure, are used to provide further understanding of the disclosure, and illustrative embodiments of the disclosure and the description thereof are used to explain the disclosure, which are not intended to unduly limit the disclosure. In the drawings.

DETAILED DESCRIPTION OF THE EMBODIMENTS

Figure 1:
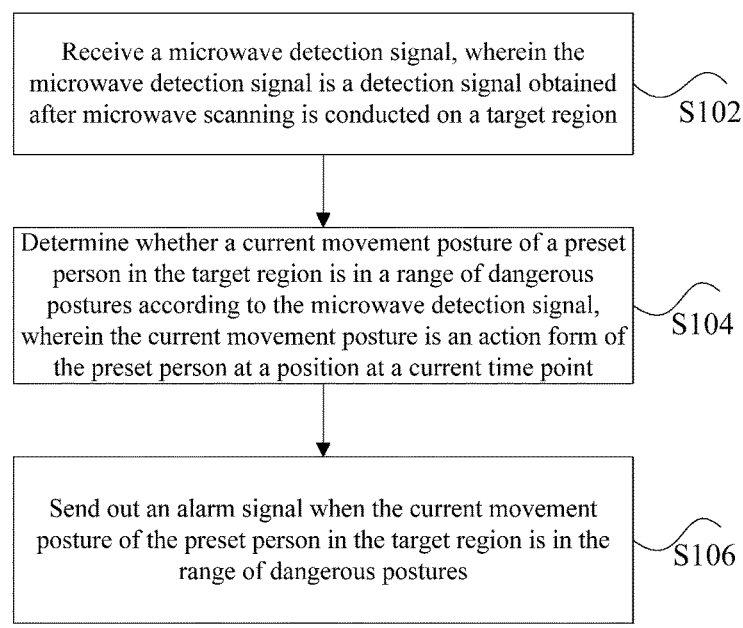
FIG. 1 is a flowchart of a method for monitoring a human movement posture according to the embodiments of the disclosure.

In order for those skilled in the art to better understand the solution of the disclosure, the technical solutions of embodiments of the disclosure will be described below clearly and comprehensively in conjunction with accompanying drawings of the embodiments of the disclosure. Apparently, the embodiments described are merely some of, rather than all of, the embodiments of the disclosure. Based on the embodiments of the disclosure, all other embodiments obtained by those of ordinary skill in the art without making creative efforts should fall within the scope of protection of the disclosure.

It should be noted that the terms "first", "second", etc., in the specification and claims of the disclosure and in the drawings, are used to distinguish between similar objects and not necessarily to describe a particular order or sequential order. It should be understood that the data so used are interchangeable under appropriate circumstances so that the embodiments of the disclosure described herein may be implemented in an order rather than those illustrated or described herein. Moreover, the terms "including/comprising" and "having" as well as any variations thereof are intended to mean covered and non-exclusive inclusion, for example, a process, a method, a system, a product or an apparatus including a series of steps or units does not need to be limited by those explicitly listed, but may include other steps or units not explicitly listed or inherent to these processes, methods, products or apparatuses.

In order for a user to conveniently understand the disclosure, some of the terms or nouns referred to in all the embodiments of the disclosure are explained as follows:

A microwave radar sensor is configured to detect a target object by emitting a millimeter wave signal, the microwave radar sensor uses a millimeter wave, and the millimeter wave refers to an electromagnetic wave in a frequency domain of 30 GHz-300 GHz. Compared with a camera and optical sensors such as an infrared sensor and a laser sensor, millimeter wave radar has higher capacity to penetrate through fog, smoke and dust and to resist interference, and has a characteristic of all weather and all time.

Doppler frequency offset, also called Doppler frequency shift, means that when a microwave radar device sends an electromagnetic wave in a certain direction at a constant rate, phase and frequency may be changed due to a transmission path. A wavelength of radiation of an object is changed due to relative movement of a wave source and a preset person. When the preset person moves in front of the wave source, a wave is compressed, the wavelength becomes low, and the frequency becomes high. When the preset person moves behind the wave source, an opposite effect may be produced, the wavelength becomes high, and the frequency becomes low.

The embodiments of the disclosure provide an embodiment of a method for monitoring a human movement posture. It should be noted that the steps shown in flowcharts of the drawings may be executed in a computer system, such as a set of computer executable instructions, and although a logical order is shown in the flowcharts, in some cases the steps shown or described are further executed in a different order from herein.

By means of a microwave radar technology in the embodiments of the disclosure, the electromagnetic wave of certain frequency is emitted, the Doppler frequency offset of an echo is detected, and then a specific posture of a person is calculated. By means of the microwave radar technology, penetrability is desirable, the human movement posture may be further detected in an environment with a high vapor concentration, such as a shower room, and personal information such as an image of the user cannot be collected, thereby protecting user's privacy. The embodiments of the disclosure are described in detail by means of all the steps as follows.

FIG. 1 is a flowchart of the method for monitoring a human movement posture according to the embodiments of the disclosure. As shown in FIG. 1, the method includes the following steps that S102, a microwave detection signal is received, wherein the microwave detection signal is a detection signal obtained after microwave scanning is conducted on a target region;

S104, it is determined whether a current movement posture of a preset person in the target region is in a range of dangerous postures according to the microwave detection signal, wherein the current movement posture is an action form of the preset person at a position at a current time point; and S106, an alarm signal is sent out when the current movement posture of the preset person in the target region is in the range of dangerous postures.

By means of the steps, in some embodiments, the microwave detection signal is received, wherein the microwave detection signal is the detection signal obtained after the microwave scanning is conducted on the target region; it is determined whether the current movement posture of the preset person in the target region is in the range of dangerous postures according to the microwave detection signal, wherein the current movement posture is the action form of the preset person at the position at the current time point; and the alarm signal is sent out when the current movement posture of the preset person in the target region is in the range of dangerous postures. In the embodiments, a microwave signal sent by the microwave radar device (such as the microwave radar sensor) has desirable penetrability, which is used to effectively monitor the environment with a high vapor concentration, such as the shower room, monitor the human movement posture and monitor whether the user is dangerous, when it is determined that a dangerous posture occurs, in some embodiments, the alarm signal is used to inform the corresponding personnel of the dangerous posture, monitoring data is accurate, other users may be informed of a monitoring result in time, user safety is guaranteed, thereby solving the technical problem that in the related technology, as the movement environment with a high vapor concentration cannot be monitored, it is impossible to determine whether the user is dangerous.

A microwave involved in the embodiments of the disclosure means a millimeter wave radar signal sent by the microwave radar device (such as the microwave radar sensor). In some embodiments, the microwave radar device is millimeter wave radar, microwave radar and microwave photovoltaic radar, and has characteristics of microwave guidance and photoelectric guidance. The embodiments of the disclosure do not limit a type and a specific model of the microwave radar device, and may set different numbers and different types of microwave radar devices according to each monitoring region and each working region.

The microwave radar device may send a microwave radar signal and receive a microwave radar detection signal, and scans the target region needing to detect, and scanning time and a scanning speed may be automatically set according to a size of the target region.

In some embodiments, the microwave radar device establishes communication connection with a center control terminal in advance, and sends, after detection is completed, a detection result to the center control terminal by means of various networks (such as a local area network and a wide area network), so that the user may inquire the detection result by means of the center control terminal.

All the steps are described in detail as follows.

S102, the microwave detection signal is received, wherein the microwave detection signal is the detection signal obtained after the microwave scanning is conducted on the target region.

In the embodiments of the disclosure, the receiving a microwave detection signal includes the following steps that a microwave radar device is controlled to scan, according to a preset scanning rule, each sub-region of the target region to obtain a scanning result; a current position of the preset person in the target region is determined based on a scanning result; the microwave radar device is controlled continuously to scan the current position and the preset person to obtain a microwave detection signal of preset duration (in some embodiments, the preset duration means duration of each scan, for example, duration from emitting, by the microwave radar apparatus, electromagnetic waves three times to receiving Doppler frequency offset signals of echoes three times); and the microwave detection signal of preset duration sent by the microwave radar apparatus is received.

In some embodiments, a mounting position and a mounting number of the microwave radar apparatus are automatically set according to the size of the target region and a size of each sub-region. After mounting is completed and the center control terminal is connected, the microwave radar device scans each sub-region to determine whether there is a person moving in the target region and accurately determine, when there is a moving person, the current position of the person, and then scans, according to a preset interval, the position and the person to obtain the microwave detection signal, so that a real-time movement posture of the person in the target region is determined based on the microwave detection signal.

In some embodiments, regarding each sub-region in the target region, the plurality of sub-regions are obtained after the microwave radar device scans the target region as a whole and then the target region is divided according to a range which may be scanned each time by the microwave radar device, and then each sub-region is scanned one time or several times to prepare for subsequent accurate determination of the current position of the preset person.

In some embodiments, regarding the determining the current position of the preset person in the target region based on the scanning result, the current position of the preset person is automatically analyzed and determined through control of the microwave radar device, or the current position of the preset person is obtained by sending, by the microwave radar device, the scanning result to preset processing device (such as the center control terminal or a server) and analyzing by the preset processing device.

As one embodiment of the disclosure, the microwave radar device is controlled to scan continuously the current position and the preset person to obtain a microwave detection signal of preset duration includes the following steps that the microwave radar device is controlled to emit continuously an electromagnetic wave of preset frequency to the current position and the preset person; and the microwave radar device is controlled to detect Doppler frequency offset of an echo to obtain the microwave detection signal of preset duration, wherein the Doppler frequency offset is used to calculate the current movement posture of the preset person.

That is, the microwave radar device is used to send the electromagnetic wave of certain frequency to scan the current position and the preset person and detect the Doppler frequency offset of the echo, and then the human movement posture is calculated by means of a certain algorithm.

S104, it is determined whether the current movement posture of the preset person in the target region is in the range of dangerous postures according to the microwave detection signal, wherein the current movement posture is the action form of the preset person at the position at the current time point.

As one embodiment of the disclosure, the determining whether a current movement posture of a preset person in the target region is in a range of dangerous postures according to the microwave detection signal includes the following steps that the microwave detection signal is analyzed to obtain the current movement postures of the preset person at different time points within preset duration; the current movement postures of the preset person at all the time points are compared to determine a posture change amplitude; and it is determined whether the current movement posture of the preset person in the target region is in the range of dangerous postures based on the posture change amplitude and a dangerous posture reference in a preset database.

That is, related data (the microwave detection signal) collected by the microwave radar device is processed, and a result of whether the current movement posture of the preset person in the target region is the dangerous posture is obtained through calculation and comparison.

In some embodiments, the dangerous posture includes, but is not limited to, a slipping posture, a fall-down posture, a stumbling posture, and an object collision posture. In some other embodiments, the dangerous posture is a changing posture during the preset duration, for example, the preset person falls down from standing in 10, which is determined to be the slipping posture/fall-down posture at this moment.

S106, the alarm signal is sent out when the current movement posture of the preset person in the target region is in the range of dangerous postures.

As one embodiment of the disclosure, the sending out an alarm signal when the current movement posture of the preset person in the target region is in the range of dangerous postures includes the following steps that an alarm module of the microwave radar apparatus is controlled to send out the alarm signal, wherein the microwave radar apparatus is configured to conduct the microwave scanning on the target region to obtain the microwave detection signal; or, when the microwave radar device and communication device held by the preset person are in the same local area network, the alarm signal is sent to the communication device; or, when the microwave radar device and the communication device held by the preset person are not in the same local area network, the alarm signal is sent to a cloud server, and the alarm signal is sent to the communication device by means of the cloud server, wherein the cloud server and the microwave radar device are in the same wide area network.

That is, when it is determined that the current movement posture of the preset person is in the range of dangerous postures, a related user is informed in various alarm modes, and three alarm modes are exemplarily described in the embodiments of the disclosure. In the first mode, the microwave radar apparatus sends out the alarm signal by itself, for example, emits an alarm bell and turns on a red-light flash lamp. In the second mode, the microwave radar device directly uploads the alarm signal to the communication device by means of the local area network when the communication device held by the user and the microwave radar device are in the same local area network, and in some embodiments, a display interface of a communication terminal displays, in a preset form, danger information corresponding to a current dangerous posture. In the third mode, when the communication device held by the user and the microwave radar device are not in the same local area network but in the same wide area network, in some embodiments, the alarm signal is uploaded to the cloud server by means of the wide area network, and the cloud server sends the alarm signal to the communication device by means of the wide area network.

According to another embodiment, after the alarm signal is sent out, the monitoring method further includes the following steps that it is monitored whether there is an alarm cancel instruction; the alarm module of the microwave radar device is controlled to stop giving an alarm when monitored that the microwave radar device receives the alarm cancel instruction; and the alarm signal is stopped being sent to the communication device when monitored that the communication device held by the preset person receives the alarm cancel instruction.

In the embodiments of the disclosure, when the alarm is cancelled, it is necessary to cancel alarms differently for the three modes mentioned above. In the first mode, the alarm cancel instruction is directly sent to the microwave radar device, for example, an alarm of the microwave radar device is directly switched off, for example, an alarm stopping instruction is sent by means of a remote-control unit/key, etc. In the second mode, the alarm cancel instruction is sent to the communication device by means of the local area network. In the third mode, the alarm cancel instruction is sent to the communication device/microwave radar device by means of the wide area network. In some other embodiments, the user controls the communication device to send the alarm cancel instruction to the microwave radar device.

In some embodiments, in the first mode, the alarm cancel instruction is sent to the microwave radar device in two forms. In the first form, the alarm cancel instruction is sent when the microwave radar device finds that there is no person in danger in a detected region. In the second form, the alarm cancel instruction is sent to a radar wave device through certain manual operation.

By means of the embodiments, a mode for monitoring a user movement posture may be determined, especially in a home, a bathhouse, a hot spring, etc., the radar device capable of sending a microwave signal/the millimeter wave signal is used to monitor the human movement posture, for example, to monitor movement postures of the elderly and children in a family when they are unattended, and effectively detect whether a person falls down, tumbles, collides with something, etc., when danger happens, related personnel may be informed in time by means of the alarm signal, and monitored persons may be helped in time, thereby guaranteeing life health of these persons.

The disclosure is described by means of another method for monitoring a human movement posture as follows.

The monitoring method may be applied to the shower room, and is suitable for the microwave radar device (a radar device for short), and the radar device is connected with a telephone held by the user.

Figure 2:
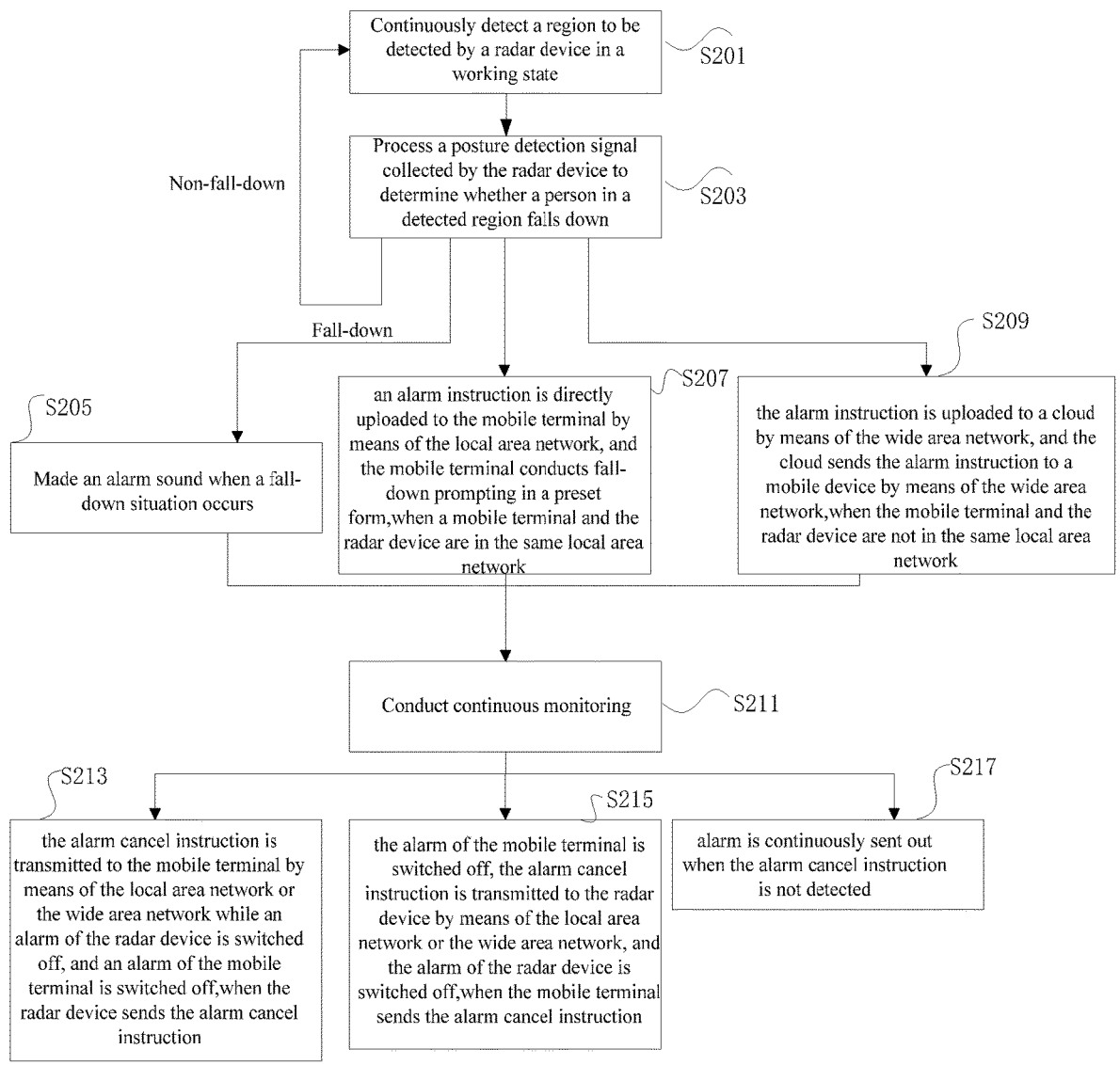
FIG. 2 is a flowchart of another method for monitoring a human movement posture according to the embodiments of the disclosure.

FIG. 2 is a flowchart of another method monitoring for a human movement posture according to the embodiments of the disclosure. As shown in FIG. 2, the method includes the following steps that S201, the radar device, in a working state, continuously detects a region to be detected. In some embodiments, the detected region is the shower room, that is, the radar device is used to detect a human posture in the shower room.

S203, a posture detection signal collected by the radar device is processed to determine whether the person in the detected region falls down; and the method returns to S201 when no fall-down situation occurs.

S205, an alarm sound is made when the fall-down situation occurs.

S207, an alarm instruction is directly uploaded to the mobile terminal by means of the local area network, and the mobile terminal conducts fall-down prompting in a preset form, when a mobile terminal and the radar device are in the same local area network.

S209, the alarm instruction is uploaded to a cloud by means of the wide area network, and the cloud sends the alarm instruction to a mobile device by means of the wide area network, when the mobile terminal and the radar device are not in the same local area network.

S211, continuous monitoring is conducted.

S213, the alarm cancel instruction is transmitted to the mobile terminal by means of the local area network or the wide area network while an alarm of the radar device is switched off, and an alarm of the mobile terminal is switched off, when the radar device sends the alarm cancel instruction.

S215, the alarm of the mobile terminal is switched off, the alarm cancel instruction is transmitted to the radar device by means of the local area network or the wide area network, and the alarm of the radar device is switched off, when the mobile terminal sends the alarm cancel instruction.

S217, alarm is continuously sent out when the alarm cancel instruction is not detected.

The method for monitoring a human movement posture may effectively monitor the human movement posture in the region to be detected such as the shower room, the human movement posture in the region to be detected is detected by means of the radar device, when the dangerous posture (such as the fall-down posture) occurs, the radar device/the mobile terminal/the radar device and the mobile terminal sends/send the alarm signal together, when the alarm cancel instruction is received, the radar device, the mobile terminal or the radar device and the mobile terminal may be subjected to alarm cancel treatment, different devices are subjected to the alarm cancel treatment according to a specific situation, by means of the characteristic that the microwave radar technology of the radar device has desirable penetrability, the region to be detected may be effectively detected, thereby realizing rapid and accurate detection.

The disclosure is described below by means of a system for monitoring a human movement posture. The monitoring system may apply the method for monitoring a human movement posture in Embodiment 1.

Figure 3:
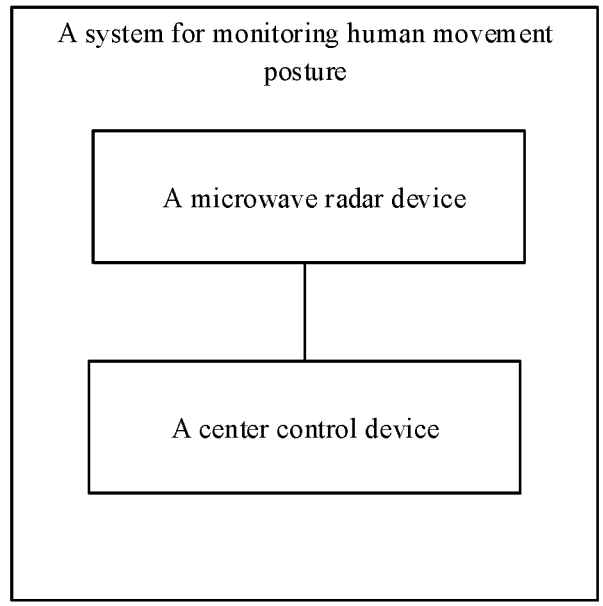
FIG. 3 is a schematic diagram of a system for monitoring a human movement posture according to the embodiments of the disclosure.

FIG. 3 is a schematic diagram of the system for monitoring a human movement posture according to the embodiments of the disclosure. As shown in FIG. 3, the monitoring system includes:

a microwave radar device 31 configured to obtain a microwave detection signal after microwave scanning is conducted on a target region; and a center control device 33 configured to analyze whether a current movement posture of a preset person in the target region is in a range of dangerous postures according to the microwave detection signal, and control an alarm module of the microwave radar device to send out an alarm signal when the current movement posture of the preset person in the target region is in the range of dangerous postures.

In some embodiments, according to the system for monitoring a human movement posture, the microwave radar device 31 is configured to obtain the microwave detection signal after the microwave scanning is conducted on the target region, and the center control device 33 is configured to analyze whether the current movement posture of the preset person in the target region is in the range of dangerous postures according to the microwave detection signal, and control the alarm module of the microwave radar device to send out the alarm signal when the current movement posture of the preset person in the target region is in the range of dangerous postures. In the embodiment, a microwave signal sent by the microwave radar device has desirable penetrability, so as to effectively monitor an environment with a high vapor concentration, such as a shower room, and effectively detect the human movement posture, when it is determined that a movement posture of a user is a dangerous posture, the alarm signal may be used to inform the corresponding personnel of the dangerous posture, monitoring data is accurate, a more accurate monitoring result is provided for the user, user safety is guaranteed, thereby solving the technical problem that in the related technology, as a movement environment with a high vapor concentration cannot be monitored, it is impossible to determine whether the user is dangerous.

In some embodiments, the system for monitoring a human movement posture further includes: communication device connects with the center control device by remote communication, the communication device which is configured to receive the microwave detection signal or alarm information; and a cloud server which is configured to store the microwave detection signal or send the alarm information to the communication device, wherein the cloud server and the microwave radar device are in the same wide area network.

Figure 4:
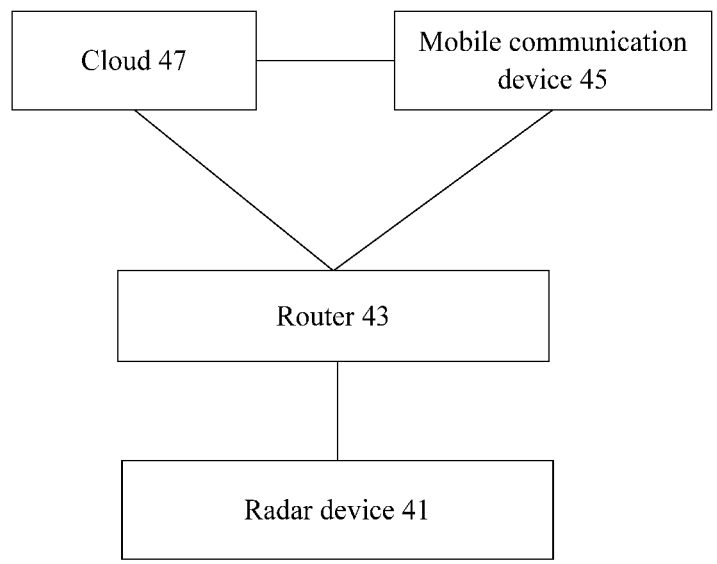
FIG. 4 is a schematic diagram of another system for monitoring a human movement posture according to the embodiments of the disclosure.

FIG. 4 is a schematic diagram of another system for monitoring a human movement posture according to the embodiments of the disclosure. As shown in FIG. 4, the monitoring system includes:

a radar device 41 configured to obtain a microwave detection signal after microwave scanning is conducted on a target region; and analyze the microwave detection signal after obtaining the microwave detection signal to obtain posture analysis data;

a router 43 configured to transmit the posture analysis data, or transmit a control instruction and an alarm cancel instruction;

mobile communication device 45 configured to receive the posture analysis data or send an instruction to the radar device; and a cloud 47 connected with the mobile communication device 45 and capable of transmitting the posture analysis data to the mobile communication device 45 and sending the instruction to the radar device.

The radar device 41 may send a radar signal to a region to be detected and detect signals such as Doppler frequency offset of an echo, then calculates, by means of a corresponding posture algorithm, a moving human posture in the region to be detected, and transmits the posture analysis data to the cloud or the mobile communication device. In some embodiments, a user checks monitoring data remotely by means of the mobile communication device. In this way, the user may know a posture signal in real time to monitor movement postures of the elderly, children, patients, etc. so as to guarantee safety of these persons.

Another aspect of the embodiments of the disclosure further provides a human posture monitor. The human posture monitor includes: a processor; and a memory configured to store an executable instruction of the processor; wherein the processor is configured to execute the executable instruction to execute the following steps that a microwave detection signal is received, wherein the microwave detection signal is a detection signal obtained after microwave scanning is conducted on a target region; it is determined whether a current movement posture of a preset person in the target region is in a range of dangerous postures according to the microwave detection signal, wherein the current movement posture is an action form of the preset person at a position at a current time point; and an alarm signal is sent out when the current movement posture of the preset person in the target region is in the range of dangerous postures.

In some embodiments, the human posture monitor includes a microwave radar device, monitors whether a user moving in a region to be detected is dangerous by sending a microwave signal, and has accurate monitoring results.

In some embodiments, the processor executes the following steps that a preset microwave radar device is controlled to scan according to a preset scanning rule, each sub-region of the target region to obtain a scanning result; a current position of the preset person in the target region is determined based on a scanning result; the microwave radar device is controlled continuously to scan the current position and the preset person to obtain a microwave detection signal of preset duration; and the microwave detection signal of preset duration sent by the microwave radar device is received.

In some embodiments, the processor executes the following steps that the microwave radar device continuously emits an electromagnetic wave of preset frequency to the current position and the preset person; and the microwave radar device detects Doppler frequency offset of an echo to obtain the microwave detection signal of preset duration.

In some embodiments, the processor executes the following steps that the microwave detection signal is analyzed to obtain the current movement postures of the preset person at all time points within preset duration; the current movement postures of the preset person at different time points are compared to determine a posture change amplitude; and it is determined whether the current movement posture of the preset person in the target region is in the range of dangerous postures based on the posture change amplitude and a dangerous posture reference in a preset database.

In some embodiments, the processor executes the following steps that an alarm module of the microwave radar device is controlled to send out the alarm signal, wherein the microwave radar device is configured to conduct the microwave scanning on the target region to obtain the microwave detection signal; or, the alarm signal is sent to the communication device when the microwave radar device and communication device held by the preset person are in the same local area network; or, the alarm signal is sent to a cloud server, and the alarm signal is sent to the communication device by means of the cloud server, when the microwave radar device and the communication device held by the preset person are not in the same local area network, wherein the cloud server and the microwave radar device are in the same wide area network.

In some embodiments, the processor executes the following steps that after the alarm signal is sent out, it is monitored whether there is an alarm cancel instruction; the alarm module of the microwave radar device is controlled to stop giving an alarm when monitored that the microwave radar device receives the alarm cancel instruction; and the alarm signal is stopped being sent to the communication device when monitored that the communication device held by the preset person receives the alarm cancel instruction.

Another aspect of the embodiments of the disclosure further provides a storage medium. The storage medium is configured to store a program, wherein when the program is executed by a processor, an device where the storage medium is located is controlled to execute any of the methods for monitoring a human movement posture.

Another aspect of the embodiments of the disclosure further provides a processor. The processor is configured to run a program, wherein when the program runs, any of the methods for monitoring a human movement posture is executed.

The preset disclosure further provides a computer program product. When being executed on a data processing device, the computer program product is suitable for executing the following initial steps that a microwave detection signal is received, wherein the microwave detection signal is a detection signal obtained after microwave scanning is conducted on a target region; according to the microwave detection signal, it is determined whether a current movement posture of a preset person in the target region is in a range of dangerous postures, wherein the current movement posture is an action form of the preset person at a position at a current time point; and an alarm signal is sent out when the current movement posture of the preset person in the target region is in the range of dangerous postures.

In some embodiments, when being executed on the data processing device, the computer program product is further suitable for executing the following initial steps that a preset microwave radar device is controlled according to a preset scanning rule, each sub-region of the target region to obtain a scanning result; a current position of the preset person in the target region is determined based on a scanning result; the microwave radar device is controlled to scan continuously the current position and the preset person to obtain a microwave detection signal of preset duration; and the microwave detection signal of preset duration sent by the microwave radar device is received.

In some embodiments, when being executed on the data processing device, the computer program product is further suitable for executing the following initial steps that the microwave radar device continuously emits an electromagnetic wave of preset frequency to the current position and the preset person; and the microwave radar device detects Doppler frequency offset of an echo to obtain the microwave detection signal of preset duration.

In some embodiments, when being executed on the data processing device, the computer program product is further suitable for executing the following initial steps that the microwave detection signal is analyzed to obtain the current movement postures of the preset person at different time points within preset duration; the current movement postures of the preset person at different time points are compared to determine a posture change amplitude; and, it is determined whether the current movement posture of the preset person in the target region is in the range of dangerous postures based on the posture change amplitude and a dangerous posture reference in a preset database.

In some embodiments, when being executed on the data processing device, the computer program product is further suitable for executing the following initial steps that an alarm module of the microwave radar device is controlled to send out the alarm signal, wherein the microwave radar device is configured to conduct the microwave scanning on the target region so as to obtain the microwave detection signal; or, the alarm signal is sent to the communication device when the microwave radar device and communication device held by the preset person are in the same local area network; or, the alarm signal is sent to a cloud server when the microwave radar device and the communication device held by the preset person are not in the same local area network, and the alarm signal is sent to the communication device by means of the cloud server, wherein the cloud server and the microwave radar device are in the same wide area network.

In some embodiments, when being executed on the data processing device, the computer program product is further suitable for executing the following initial steps that after the alarm signal is sent out, it is monitored whether there is an alarm cancel instruction; the alarm module of the microwave radar device is controlled to stop giving an alarm when monitored that the microwave radar device receives the alarm cancel instruction; and the alarm signal is stopped being sent to the communication device when monitored that the communication device held by the preset person receives the alarm cancel instruction.

The sequence numbers of the embodiments of the disclosure are only for description and do not indicate advantages and disadvantages of the embodiments.

In the embodiments of the disclosure, the description of each embodiment has its own emphasis, and parts not described in detail in some embodiment may be seen from the related descriptions of other embodiments.

It should be understood that in several embodiments provided in the disclosure, the disclosed technical content may be implemented in other ways. The device described above embodiment is merely exemplary. For example, the division of units is a kind of logic function division, and there may be other division modes in actual implementation, for example, a plurality of units or assemblies are combined or integrated into another system, or some characteristics are ignored or not executed. In another aspect, in some embodiments, the mutual coupling or direct coupling or communication connection shown or discussed is the indirect coupling or communication connection by means of some interfaces, units or modules, which are electrical or other forms in some embodiments.

The units described as separate components are allowed to be physically separated or not, and the components shown as units are allowed to be physical units or not, that is, they are allowed to be located in one place or distributed to a plurality of units. It is allowed to select some or all of the units according to actual needs to realize the purpose of this embodiment.

In addition, all functional units in the embodiments of the disclosure are integrated into one processing unit, or each unit is physically present separately, or two or more units are integrated into the same unit. The integrated unit may be implemented in the form of hardware, or may be implemented in the form of a software functional unit.

The integrated unit may be stored in one computer-readable storage medium when implemented in the form of the software functional unit and sold or used as an independent product. Based on such understanding, the technical solution of the disclosure, or substantially a part thereof, which makes a contribution to the related technology, or all or part of the technical solution may be embodied in a form of a software product, and the computer software product is stored in a storage medium and includes several instructions to make a set of computer device (which is a personal computer, a server, network device, etc. In some embodiments) execute all or part of steps of the method of all the embodiments of the disclosure. The foregoing storage medium includes a USB flash disk, a read-only memory (ROM), a random access memory (RAM), a mobile hard disk, a magnetic disk, an optical disk, and other media capable of storing program codes.

What are described above are only some embodiments of the disclosure, and it should be pointed out that for those of ordinary skill in the art, without departing from the principle of the disclosure, some improvements and embellishments are allowed, and these improvements and embellishments should further be regarded as the protection scope of the disclosure.

What is claimed is:

1. A method for monitoring a human movement posture, comprising:
receiving a microwave detection signal, wherein the microwave detection signal is a detection signal obtained after microwave scanning is conducted on a target region;
determining whether a current movement posture of a preset person in the target region is in a range of dangerous postures according to the microwave detection signal, wherein the current movement posture is an action form of the preset person at a position at a current time point; and
sending out an alarm signal when the current movement posture of the preset person in the target region is in the range of dangerous postures;
wherein the receiving a microwave detection signal comprises:
controlling a preset microwave radar device to scan, according to a preset scanning rule, each sub-region of the target region to obtain a scanning result;
determining a current position of the preset person in the target region based on the scanning result; and
controlling the microwave radar device to scan continuously the current position and the preset person to obtain a microwave detection signal of preset duration; and
receiving the microwave detection signal of preset duration sent by the microwave radar device;
the dangerous posture comprises a slipping posture, a fall-down posture, a stumbling posture, and an object collision posture;
scanning a target area by the microwave radar device, dividing the target area based on a range that the microwave radar device can scan each time, to obtain multiple sub-areas;
wherein the sending out an alarm signal when the current movement posture of the preset person in the target region is in the range of dangerous postures comprises:
controlling an alarm module of a microwave radar device to send out the alarm signal, wherein the microwave radar device is configured to conduct the microwave scanning on the target region to obtain the microwave detection signal; or, sending the alarm signal to a communication device when the microwave radar device and communication device held by the preset person are in the same local area network; or, sending the alarm signal to a cloud server and sending the alarm signal to the communication device by means of the cloud server, when the microwave radar device and the communication device held by the preset person are not in the same local area network, wherein the cloud server and the microwave radar device are in the same wide area network.

2. The method for monitoring a human movement posture as claimed in claim 1, wherein scanning continuously the current position and the preset person to obtain a microwave detection signal of preset duration comprises:

controlling the microwave radar device to emit an electromagnetic wave of preset frequency to the current position and the preset person; and controlling the microwave radar device to detect Doppler frequency offset of an echo to obtain the microwave detection signal of preset duration.

3. The method for monitoring a human movement posture as claimed in claim 1, wherein after the alarm signal is sent out, the monitoring method further comprises:

monitoring whether there is an alarm cancel instruction;

controlling the alarm module of the microwave radar device to stop giving an alarm when monitored that the microwave radar device receives the alarm cancel instruction; and stopping sending the alarm signal to the communication device, when monitored that the communication device held by the preset person receives the alarm cancel instruction.

4. A human posture monitor, comprising:
a processor; and
a memory which is configured to store an executable instruction of the processor;
wherein the processor is configured to execute the executable instruction to execute the method for monitoring a human movement posture as claimed in claim 1.

5. A human posture monitor, comprising:
a processor; and
a memory which is configured to store an executable instruction of the processor;
wherein the processor is configured to execute the executable instruction to execute the method for monitoring a human movement posture as claimed in claim 2.

6. A human posture monitor, comprising:
a processor; and
a memory which is configured to store an executable instruction of the processor;
wherein the processor is configured to execute the executable instruction to execute the method for monitoring a human movement posture as claimed in claim 3.

7. The method for monitoring a human movement posture as claimed in claim 1, wherein the determining whether a current movement posture of a preset person in the target region is in a range of dangerous postures according to the microwave detection signal, comprises:

analyzing the microwave detection signal to obtain the current movement postures of the preset person at different time points within a preset duration;

comparing the current movement postures of the preset person at each of the different time points to determine a posture change amplitude; and determining whether the current movement posture of the preset person in the target region is in the range of dangerous postures based on the posture change amplitude and a dangerous posture reference in a preset database.

8. A system for monitoring a human movement posture, comprising:

a microwave radar device which is configured to obtain a microwave detection signal after microwave scanning is conducted on a target region; and a center control device which is configured to analyze whether a current movement posture of a preset person in the target region is in a range of dangerous postures according to the microwave detection signal, and control an alarm module of the microwave radar device to send out an alarm signal, when the current movement posture of the preset person in the target region is in the range of dangerous postures;

wherein a microwave radar device which is configured to obtain a microwave detection signal comprises:

the microwave radar device, configured to scan, according to a preset scanning rule, each sub-region of the target region to obtain a scanning result;

the microwave radar device, configured to determine a current position of the preset person in the target region based on the scanning result; and the microwave radar device, configured to scan continuously the current position and the preset person to obtain a microwave detection signal of preset duration; and the microwave radar device, configured to obtain the microwave detection signal of preset duration sent by the microwave radar device;

the dangerous posture comprises a slipping posture, a fall-down posture, a stumbling posture, and an object collision posture;

the microwave radar device, configured to scan a target area, divide the target area based on a range that the microwave radar device can scan each time, to obtain multiple sub-areas;

control an alarm module of a microwave radar device to send out the alarm signal, wherein the microwave radar device is configured to conduct the microwave scanning on the target region to obtain the microwave detection signal; or, send the alarm signal to a communication device when the microwave radar device and communication device held by the preset person are in the same local area network; or, send the alarm signal to a cloud server and sending the alarm signal to the communication device by means of the cloud server, when the microwave radar device and the communication device held by the preset person are not in the same local area network.

9. The system for monitoring a human movement posture as claimed in claim 8, further comprising:

a communication device that connects with the center control device by remote communication, wherein the communication device is configured to receive the microwave detection signal or alarm information; and a cloud server which is configured to store the microwave detection signal or send the alarm information to the communication device, wherein the cloud server and the microwave radar device are in the same wide area network.

* * * * *